United States Patent

Young

[15] 3,704,066

[45] Nov. 28, 1972

[54] REFLEX EXPOSURE MEDIUM

[72] Inventor: Eugene F. Young, Henrietta, N.Y.

[73] Assignee: Xerox Corporation, Stamford, Conn.

[22] Filed: Oct. 20, 1970

[21] Appl. No.: 82,282

[52] U.S. Cl. .......................355/11, 96/45.1, 355/78, 355/99

[51] Int. Cl. ..........................G03c 1/92, G03b 27/04

[58] Field of Search ..............355/11, 99, 78; 96/45.1

[56] References Cited

UNITED STATES PATENTS

| | | | |
|---|---|---|---|
| 3,560,084 | 2/1971 | Limberger | 355/1 |
| 3,168,022 | 2/1965 | Limberger | 355/11 X |
| 3,445,163 | 5/1969 | Ohoshima | 355/11 X |
| 3,335,003 | 8/1967 | Snelling | 355/11 X |
| 3,060,806 | 10/1962 | Lewis | 355/66 X |

*Primary Examiner*—Samuel S. Matthews
*Assistant Examiner*—Michael D. Harris
*Attorney*—James J. Ralabate, Donald F. Daley and Terry J. Anderson

[57] ABSTRACT

An exposure medium for producing a reflex exposure of an original image onto a photosensitive surface including a transparent conductive member adapted for positioning proximate to the original image to be reproduced. The exposure medium further includes an opaque conductive member spaced from the transparent conductive member and adapted for positioning proximate to the photosensitive surface. A luminescent member is positioned between the transparent conductive member and the opaque conductive member and is adapted when energized to illuminate the original image through the transparent conductive member. A plurality of light conductive members are disposed throughout the opaque conductive member and the luminescent member for conducting patterns of light reflected from the original image through the opaque conductive member and thus exposing the photosensitive surface according to the reflected light patterns. The light conductive members include light insulating means associated therewith and with the luminescent member for preventing the direct illumination of the luminescent member from reaching the photosensitive surface.

12 Claims, 3 Drawing Figures

INVENTOR
EUGENE F. YOUNG

BY Terry J. Anderson
ATTORNEY

REFLEX EXPOSURE MEDIUM

BACKGROUND OF THE INVENTION

This invention relates generally to image reproduction and more particularly to reflex exposure of an image onto a photosensitive surface.

In the art of photography and more particularly the art of electrophotography for example, where a photosensitive surface is exposed to an image, the exposure is conventionally made through a camera or similar apparatus. Such exposure systems are necessarily both expensive and occupy a large amount of the total space of the imaging system. The expensiveness of such systems is largely attributable to the inherent cost in obtaining the necessary high quality optical systems required for fine quality reproductive work. The space requirement is a result of the spacing required between the original image to be reproduced and the photosensitive surface when conventional optical systems are employed.

To eliminate the use of such conventional optical systems it is necessary that the original image be disposed virtually adjacent to the photosensitive surface. Otherwise substantial degradation of resolution may result.

Various arrangements for accomplishing this result have been proposed. One such arrangement is to illuminate the original image through the photosensitive layer so that a light image of the original is reflected onto the photosensitive surface from the original. The source of illumination may also be directed from the other side through the original which partially blocks the illumination in the image configuration permitting an illumination pattern only in the image configuration to reach the photosensitive surface. In both of these arrangements the original image and the photosensitive surface are placed immediately adjacent to each other resulting in a high quality of resolution. However, when the source of illumination is directed through the photosensitive layer, the resulting overall exposure of the photosensitive layer reduces its efficiency and its contrast capabilities. When the light is directed through the original, the characteristics of the original have an excessive effect on the reproduced image, and of course, it is impossible to utilize this arrangement with an opaque or dual sided original.

Additional arrangements have been proposed in which a source of illumination is introduced between the photosensitive surface and the original image. In one such arrangement the source of illumination may comprise a luminescent layer which provides the necessary light for exposure of the photosensitive surface without necessitating passing light through either the original image or the photosensitive surface. However, in this arrangement contrast may be reduced considerably due to the difficulty in avoiding undesired illumination of the photosensitive surface.

SUMMARY OF THE INVENTION

Accordingly, it is an object of the present invention to reflex expose an image onto a photosensitive surface.

It is another object of the present invention to provide an improved reflex exposure system for reproducing original images.

It is still another object of the present invention to provide an improved reflex exposure system having an enhanced contrast capability.

It is yet another object of the present invention to provide an improved luminescent reflex exposure medium.

It is yet a further object of the present invention to provide a luminescent reflex exposure medium which yields high contrast exposures.

These and other objects of the invention are attained by means of a transparent conductive member which is adapted for positioning proximate to an original image to be reproduced, an opaque conductive member spaced from the transparent conductive member which is adapted for positioning proximate to a photosensitive surface, a luminescent member positioned between the transparent conductive member and the opaque conductive member which is adapted when energized to illuminate the original image to be reproduced through the transparent conductive member, a plurality of light conductive members disposed throughout the opaque conductive member and the luminescent member for conducting patterns of light reflected from the original image through the opaque conductive member to expose the photosensitive surface according to the reflected light patterns and light insulating means associated with the light conductive members and the luminescent member for preventing the direct illumination of the luminescent member from reaching the photosensitive surface.

Other objects of the invention will become readily apparent to those skilled in the art in view of the following detailed disclosure and description thereof, especially when read in conjunction with the accompanying drawings.

DESCRIPTION OF THE PREFERRED EMBODIMENTS

Figure 3:
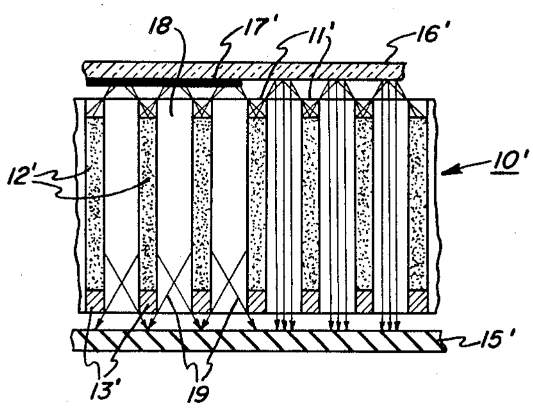
FIG. 3 PRIOR ART
FIG. 3 is an enlarged cross sectional view showing a prior art reflex imaging arrangement having certain attendant disadvantages associated therewith not found in the present invention.

The present invention may best be understood by reference first to prior art reflex exposure systems, the instant invention being intended as an improvement over such prior art systems. FIG. 3 of the drawings therefore illustrates one arrangement which is exemplary of such prior art systems.

As may be seen from FIG. 3, a document 16' having image areas 17' thereon is placed in superposed spaced relationship with a photosensitive surface 15' onto which the document 16' is to be exposed. The document is spaced from the photosensitive surface by an exposure medium 10' which may comprise a transparent conductive layer or member 11', an opaque conductive layer or member 13' and luminescent layer or member 12' sandwiched between opaque layer 13' and transparent layer 11'. Luminescent member 12' may comprise one of any number of commercially available luminescent materials. Such materials may include mixtures in various proportions of phosphors and suitable binder materials such as resins for example. Transparent conductive member 11' may comprise any suitable material which exhibits the characteristics of being both optically transparent and electrically conductive. One suitable material which may be used is NESA glass which is a glass coated with conductive tin oxide on the surface thereof. Opaque conductive member 13' may comprise any suitable material which exhibits the characteristics of being optically opaque and electrically conductive. Suitable materials include opaque glasses overcoated with a thin layer of metal such as aluminum for example.

The imaging medium 10' comprising transparent conductive layer 11', luminescent layer 12' and opaque conductive layer 13', includes a plurality of small diameter openings or apertures 18 spaced throughout the imaging medium extending from the transparent conductive layer 11' through luminescent layer 12' and opaque conductive layer 13'.

Upon application of a suitable electrical potential between transparent conductive member 11' and opaque conductive member 13' the electric field generated therebetween causes luminescent layer 12' to luminesce thereby emitting light and illuminating the superposed document 16'. Image areas 17' on document 16' diffuse or absorb light rays emitted from luminescent layer 12' and therefore no light rays are reflected therefrom in the image areas 17' through openings or apertures 18 onto the photosensitive surface 15'. In the non-image areas however, light rays are reflected from the document 16' through openings 18 onto photosensitive surface 15' thereby exposing photosensitive surface 15' to a pattern of radiation corresponding to the image areas on document 16'.

As will be apparent however, because of the nature of the structure of the imaging medium 10' some light rays 19 from the luminescent layer 12' will illuminate the photosensitive surface in the image areas thereby subtracting from the quality and resolution of the resulting image on photosensitive surface 15 which would be otherwise obtainable if the imaging medium 10' were in fact a totally effective reflex imaging medium. This results from the fact that in such prior art imaging arrangements there have been no provisions for obtaining positive illumination of the photosensitive surface only in the non-image areas without also getting a false unwanted illumination in the image areas. That is, light in such systems from luminescent layer 12' is not only emitted toward the document 16' through openings 18 but is also emitted in a direction toward photosensitive surface 15' from luminescent layer 12' through openings 18 thereby resulting in a false unwanted illumination of photosensitive surface 15' in the image areas. It is therefore this shortcoming in such prior art arrangements that the present invention overcomes.

Figure 1:
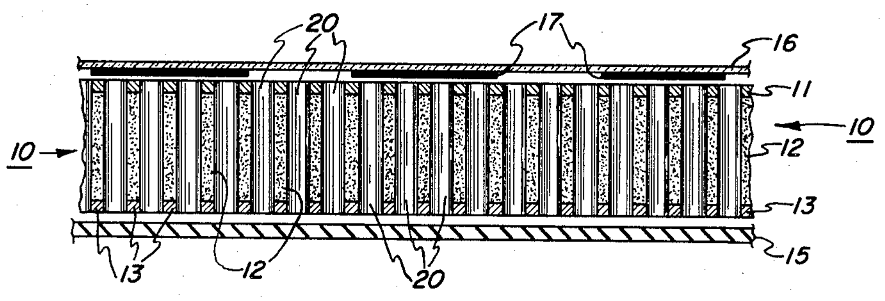
FIG. 1 is a cross sectional view showing the imaging arrangement and exposure medium as contemplated by the present invention.
Figure 2:
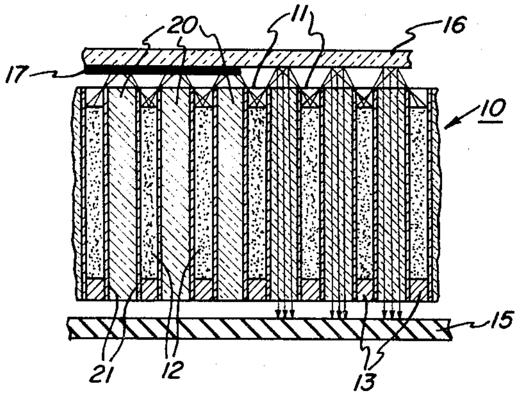
FIG. 2 is an enlarged portion of the arrangement of FIG. 1.

Accordingly, it will therefore be appreciated that the present invention as illustrated in FIGS. 1 and 2 is intended as an improvement over prior imaging arrangements as exemplified in FIG. 3 of the drawings.

As may be seen from FIGS. 1 and 2, a document 16 having image areas 17 thereon is placed in superposed spaced relationship with a photosensitive surface 15 onto which the document 16 is to be exposed in the same general manner as the prior art arrangement described in connection with FIG. 3. The document is spaced from the photosensitive surface by an exposure medium 10 which may comprise a transparent conductive layer or member 11, an opaque conductive layer or member 13 and a luminescent layer or member 12 sandwiched between opaque layer 12 and transparent layer 11. As in the case of the prior art arrangement of FIG. 3, luminescent member 12 may comprise one of any number of commercially available luminescent materials. Such materials may include mixtures in various proportions of phosphors and suitable binder materials such as resins for example, the materials depending to a large extent on the type of photosensitive surface onto which the document 16 is to be exposed. Transparent conductive member 11 again may comprise any suitable material which exhibits the characteristics of being both optically transparent and electrically conductive. One suitable material which may be used is a non-conductive material overcoated with a thin layer of conductive material such as NESA glass which is a glass coated with conductive tin oxide on the surface thereof. Opaque conductive member 13 again may comprise any suitable material which exhibits the characteristics of being optically opaque and electrically conductive. Suitable materials include opaque glasses overcoated with a thin layer of metal such as aluminum for example.

The imaging medium 10 comprising transparent conductive layer 11, luminescent layer 12 and opaque conductive layer 13 instead of including the plurality of small diameter openings or apertures 18 as in the prior art arrangement of FIG. 3 includes a plurality of fiber optic bundles 20 spaced throughout the imaging medium extending from the transparent conductive layer 11 through luminescent layer 12 and opaque conductive layer 13. The fiber optic bundles 20 are optically conductive along the axial length thereof as is well known and are coated about the circumference thereof with optically opaque material 21 to prevent light from entering the bundle directly from luminescent layer 12.

Thus upon application of a suitable electrical potential between transparent conductive member 11 and opaque conductive member 13 the electric field generated therebetween causes luminescent layer 12 to luminesce thereby emitting light and illuminating the superposed document 16. However, unlike the prior art arrangement of FIG. 3, the fiber optic bundles 20 permit light from luminescent layer 12 to be emitted therefrom only in the direction of the document 16 and prevent any back illumination from luminescent layer 12 in the direction toward photosensitive surface 15. As light from luminescent layer 12 thus passes through transparent conductive layer 11 the document 16 is illuminated in both the image and non-image areas thereon. The image areas 17 on the document 16 diffuse or absorb light rays emitted from the luminescent layer 12 and therefore no light rays are reflected therefrom to be transmitted through fiber optic bundles 20 underlying these areas. Hence, no light in these areas is projected onto photosensitive surface 15. However, in the non-image areas on document 16 light rays emitted from the luminescent layer 12 are reflected from document 16 and are transmitted through the respective fiber optic bundles 20 underlying these areas to be projected onto photosensitive surface 15. Thus the photosensitive surface 15 is exposed to light from luminescent layer 12 only in accordance with the image configuration on document 16. This arrangement therefore results in an actual and true reflex exposure of the original document onto the photosensitive surface by the reflex exposure medium 10.

The reflex exposure medium as contemplated by the present invention may be used in a variety of applications. For example, although reference has been made herein to an original document as the image to be reproduced it is contemplated that the imaging medium is applicable to producing images of an original other than documents. It should also be appreciated that the reflex exposure medium as contemplated by the present invention is adapted for making various types of exposures including halftones. It should further be appreciated that the reflex exposure medium as contemplated by the present invention may be used in conjunction with various types of photosensitive surfaces including conventional photographic materials as well as electrophotographic materials such as may be used as a photoreceptor in practicing xerography.

While the invention has been described with reference to preferred arrangements, it will be generally understood by those skilled in the art that various changes may be made and equivalents may be substituted for elements thereof without departing from the true spirit and scope of the invention.

What is claimed is:

1. An exposure medium for producing a reflex exposure of an original image onto a photosensitive surface comprising, an opaque member spaced proximate to the photosensitive surface, a luminescent member positioned between said original image and said opaque member adapted when energized to illuminate said original image, and a plurality of light conductive members disposed throughout said opaque member and said luminescent member for conducting patterns of light reflected from said original image through said opaque conductive member and exposing said photosensitive surface according to the reflected light patterns, said light conductive members including means for preventing light from being transmitted to said light conductive members directly from said luminescent members to thereby prevent the direct illumination from said luminescent member from reaching said photosensitive surface.

2. The exposure medium according to claim 1, wherein said light conductive members comprises fiber optic bundles.

3. An exposure system for producing a reflex exposure of an original image onto a photosensitive surface comprising, a layer of opaque material positioned proximately adjacent in overlying relationship with said photosensitive surface, a layer of luminescent material overlying said layer of opaque material adapted when energized to illuminate an original image which is to be reproduced, and a plurality of light conductive members disposed throughout said layer of luminescent material and extending at generally right angles thereto through said opaque layer, said light conductive members including means for preventing light from being transmitted to said light conductive members directly from said luminescent layer to thereby prevent the direct illumination of said luminescent layer from reaching the photosensitive surface.

4. The exposure system according to claim 3, said light conductive members comprising fiber optic bundles.

5. An exposure system for producing a reflex exposure of an original image onto a photosensitive surface comprising, an optically opaque layer of electrically conductive material positioned proximate to in overlying relationship with said photosensitive surface, a layer of luminescent material overlying said opaque layer of conductive material adapted when energized to illuminate a document to be reproduced, a layer of optically transparent electrically conductive material overlying said layer of luminescent material proximate to in underlying relationship with an original image which is to be reproduced, and a plurality of electrically insulating light conductive members disposed throughout said layer of luminescent material and extending at generally right angles thereto through said opaque conductive and said transparent conductive layers, including means for preventing light from being transmitted to said light conductive members directly from said luminescent material to thereby prevent the direct illumination of said luminescent layer from reaching said photosensitive surface.

6. The exposure system according to claim 5, said light conducting members comprising fiber optic bundles.

7. An exposure system for producing a reflex exposure of an original image onto a photosensitive surface comprising, an optically opaque layer of material positioned proximate to in overlying relationship with said photosensitive surface, a layer of luminescent material overlying said opaque layer of material adapted when energized to illuminate a document to be reproduced, and a plurality of light conductive members disposed throughout said layer of luminescent material and extending at generally right angles thereto through said opaque layer, said light conductive members including means for preventing light from being transmitted to said light conductive members directly from said luminescent layer to thereby prevent the direct illumination of said luminescent member from reaching said photosensitive surface.

8. The exposure system according to claim 7, said light conducting members comprising fiber optic bundles.

9. An exposure medium for producing a reflex exposure of an original image onto a photosensitive surface comprising, a transparent conductive member adapted for positioning proximate to the original image, an opaque conductive member spaced from said transparent conductive member adapted for positioning proximate to the photosensitive surface, a luminescent member positioned between said transparent conductive member and said opaque conductive member adapted when energized to illuminate said original image through said transparent conductive member, and a plurality of light conductive members disposed throughout said opaque conductive member and said luminescent member for axially conducting patterns of light reflected from said original image through said opaque conductive member and exposing said photosensitive surface according to the reflected light patterns, said light conductive members including means for preventing light from said light conductive members directly from said luminescent member to thereby prevent the direct illumination of said luminescent member from reaching said photosensitive surface.

10. The exposure medium according to claim 9, wherein said light conductive members comprises fiber optic bundles.

11. An exposure system for producing a reflex exposure of an original image onto a photosensitive surface comprising, a layer of opaque conductive material positioned proximately adjacent in overlying relationship with said photosensitive surface, a layer of luminescent material overlying said layer of opaque conductive material adapted when energized to illuminate an original image which is to be reproduced, a layer of transparent conductive material overlying said layer of luminescent material proximately adjacent in underlying relationship with an original image which is to be reproduced, and a plurality of light conductive members disposed throughout said layer of luminescent material and extending at generally right angles thereto through said opaque conductive and said transparent conductive layers, including means for preventing light from being transmitted to said light conductive members directly from said luminescent material to thereby prevent the direct illumination of said luminescent layer from reaching said photosensitive surface.

12. The exposure system according to claim 11, said light conductive members comprising fiber optic bundles.

* * * * *